Patented Dec. 26, 1939

2,184,323

UNITED STATES PATENT OFFICE 2,184,323

CATHODE ACTIVATION AND DEGASSING

Hans J. Spanner, Berlin-Kladow, Germany

No Drawing. Application August 14, 1937, Serial No. 159,041. In Germany June 23, 1933

5 Claims. (Cl. 176—126)

The production of so-called activated cathodes proceeds in general as follows, that a carrier material, for example nickel, is covered with a compound of an activating material, e. g., with barium oxide, and that thereafter the cathode undergoes a reduction of these compounds by heating the cathode under vacuum. With a normal heated cathode the heating is effected by the heating current; whereas in the case of the arc heated cathode a heating by high frequency or ionic bombardment is resorted to.

With this heating process, especially if it concerns a cathode of the last mentioned kind which comprises a metal structure, it results that in the course of the heating there is produced a deposit of materials bursting off from the electrode. These deposit readily on the glass and create a serious danger of cracking and decomposition. Moreover, it is hardly avoidable that with careful activation and degassing a vaporizing of the material of the cathode occurs whereby a darkening of the light tube or the other parts of the discharge tube should occur.

According to the invention these disadvantages are avoided if one uses a process which is known for ordinary electrodes, but has not been used in the foregoing manner. One fuses in or inserts the already coated cathode in suitable manner into a high vacuum-tight vessel and undertakes the heating necessary for conversion at high vacuum, or in a gas or gases at low pressure which is or are inert with respect to the activating metal but in which reduction of its oxide may occur. Proceeding with the process, one heats e. g., with ionic bombardment, continuing the heating until no more foreign gases appear. One notices a further advantage up to the complete cooling of the cathode, since already in that time further undesirable reactions can occur, whereas according to this process one does not, until after complete cooling, bring the cathode into the open atmosphere in order to insert it into a suitable discharge vessel. In this final location it needs only a short further heating. One must take care, naturally, that the cathode after the preliminary degassing is not exposed to any undesirable vapors or moisture and also that it does not remain too long in the air.

The foregoing process indicates only the principle; variants according to the invention can always follow. For example, the same effect can be attained if the cathode is inserted immediately into the suitable discharge vessel and the part of the tube then coated which could be stained or damaged by the materials given off from the cathode. After the preliminary degassing the coating is again removed, perhaps with opening of the vessel.

If follows also from the practice above described that the discharge tubes remain entirely clean and that the suitable pumping process is shortened, since with the preliminary degassing any number of cathodes can be treated in a single degassing vessel.

What I claim is:

1. Process for producing electrical discharge lamps with arc heated electrodes by which the electrode carrier metal is provided with a coating of an alkaline earth metal oxide, and alkaline earth metal is produced by reduction of the oxide, which is characterized by the fact that the electrode provided with the alkaline earth metal oxide is heated in a separate auxiliary vessel under a high vacuum until a thorough degassing of the electrode and reduction of the alkaline earth metal oxide occurs whereupon the auxiliary vessel is removed from around the electrode and the electrode is then first built into the lamp vessel.

2. Process for producing electrical discharge lamps with arc heated electrodes in which the electrodes provided with an alkaline earth metal oxide are heated in the discharge vessel under high vacuum until a thorough degassing of the electrode and a reduction of the alkaline earth oxide occurs, characterized by the fact that the particles of material given off during the heating of the electrode are collected by an interior part removably inserted in the lamp vessel, serving as a temporary screen or shield.

3. Process for producing electrical discharge lamps with arc heated electrodes by which the electrode carrier metal is provided with a coating of an alkaline earth metal oxide, and alkaline earth metal is produced by reduction of the oxide, which is characterized by the fact that the electrode provided with the alkaline earth metal oxide is heated in an auxiliary vessel under a high vacuum until a thorough degassing of the electrode and reduction of the alkaline earth metal oxide occurs and by thereafter removing the auxiliary vessel from around the electrode before sealing off the lamps with said electrodes.

4. Process for producing electrical discharge lamps with arc heated electrodes by which the electrode carrier metal is provided with a coating of an alkaline earth metal oxide, and alkaline earth metal is produced by reduction of the oxide, which is characterized by the fact that the electrode provided with the alkaline earth metal oxide is heated in a separate auxiliary vessel filled to a low pressure with a gas which is inert with respect to the activation metal of the electrode until a thorough degassing of the electrode and a reduction of the alkaline earth metal oxide occurs, whereupon the auxiliary vessel is removed from around the electrode and the electrode is then first built into the lamp vessel.

5. Process for producing electrical discharge lamps with arc heated electrodes by which the electrode carrier metal is provided with a coating of an alkaline earth metal oxide, and alkaline earth metal is produced by reduction of the oxide, which is characterized by the fact that the electrode provided with the alkaline earth metal oxide is heated in an auxiliary vessel under a high vacuum until a thorough degassing of the electrode and a reduction of the alkaline earth metal oxide occurs whereupon the auxiliary vessel is removed from around the electrode and the electrode is then first built into the lamp vessel, and after evacuating and degassing the lamp vessel, the electrode is subjected to a further heating to incandescence and under high vacuum.

HANS J. SPANNER.